US010020541B2

(12) United States Patent
Sale et al.

(10) Patent No.: US 10,020,541 B2
(45) Date of Patent: Jul. 10, 2018

(54) LAMINATING METHOD

(71) Applicant: Manz Italy S.R.L., Sasso Marconi (Bologna) (IT)

(72) Inventors: Massimiliano Sale, Sasso Marconi (IT); Marco Vivarelli, Casalecchio di Reno (IT)

(73) Assignee: Manz Italy S.R.L., Sasso Marconi (Bologna) (IT)

( * ) Notice: Subject to any disclaimer, the term of this patent is extended or adjusted under 35 U.S.C. 154(b) by 190 days.

(21) Appl. No.: 15/034,541

(22) PCT Filed: Nov. 10, 2014

(86) PCT No.: PCT/IB2014/065926
§ 371 (c)(1),
(2) Date: May 4, 2016

(87) PCT Pub. No.: WO2015/068143
PCT Pub. Date: May 14, 2015

(65) Prior Publication Data
US 2016/0276712 A1    Sep. 22, 2016

(30) Foreign Application Priority Data
Nov. 11, 2013   (IT) .............................. MO2013A0311

(51) Int. Cl.
*H01M 10/0585* (2010.01)
*H01M 10/04* (2006.01)
(Continued)

(52) U.S. Cl.
CPC ..... *H01M 10/0585* (2013.01); *B32B 37/0015* (2013.01); *B32B 37/0023* (2013.01);
(Continued)

(58) Field of Classification Search
CPC ........................... H01M 10/0585; B32B 37/06
See application file for complete search history.

(56) References Cited

U.S. PATENT DOCUMENTS

2002/0007552 A1* 1/2002 Singleton .......... H01M 10/0404
29/623.3
2014/0026400 A1   1/2014 Yuhara et al.

FOREIGN PATENT DOCUMENTS

EP         2 648 260        10/2013
WO     WO 2012/137904      10/2012

OTHER PUBLICATIONS

International Search Report for International Application PCT/IB2014/065926, dated Feb. 27, 2015.

* cited by examiner

*Primary Examiner* — Daniel H Lee
(74) *Attorney, Agent, or Firm* — Sean D. Detweiler, Esq.; Morse, Barnes-Brown & Pendleton, P.C.

(57)          ABSTRACT

The invention relates to a method for forming a monocell or a bi-cell for a lithium-ion electric energy accumulating device, wherein it is provided to first laminate, in a first laminating unit, a first arrangement comprising a first electrode and two separating elements, so as to obtain a multi-layered laminated element. In the first arrangement, the electrode is interposed between the two separating elements without yet being laminated to either of the two separating elements. The method then provides to form a second arrangement comprising the multilayered laminated element and a second electrode. The method finally provides to laminate the second arrangement in a second laminating unit, so as to obtain the cell.

16 Claims, 3 Drawing Sheets

(51) Int. Cl.
*H01M 10/0525* (2010.01)
*B32B 37/00* (2006.01)
*B32B 37/06* (2006.01)
*B32B 37/10* (2006.01)
*H01M 4/66* (2006.01)
*H01M 2/16* (2006.01)
*H01M 4/131* (2010.01)
*H01M 4/133* (2010.01)
*B32B 37/22* (2006.01)
*H01M 4/04* (2006.01)
*H01M 4/02* (2006.01)

(52) U.S. Cl.
CPC .............. *B32B 37/06* (2013.01); *B32B 37/10* (2013.01); *H01M 4/661* (2013.01); *H01M 10/0404* (2013.01); *H01M 10/0525* (2013.01); *B32B 37/223* (2013.01); *B32B 2305/026* (2013.01); *B32B 2309/02* (2013.01); *B32B 2309/12* (2013.01); *B32B 2457/00* (2013.01); *B32B 2457/10* (2013.01); *H01M 2/166* (2013.01); *H01M 4/0404* (2013.01); *H01M 4/131* (2013.01); *H01M 4/133* (2013.01); *H01M 2004/021* (2013.01); *H01M 2004/027* (2013.01); *H01M 2004/028* (2013.01)

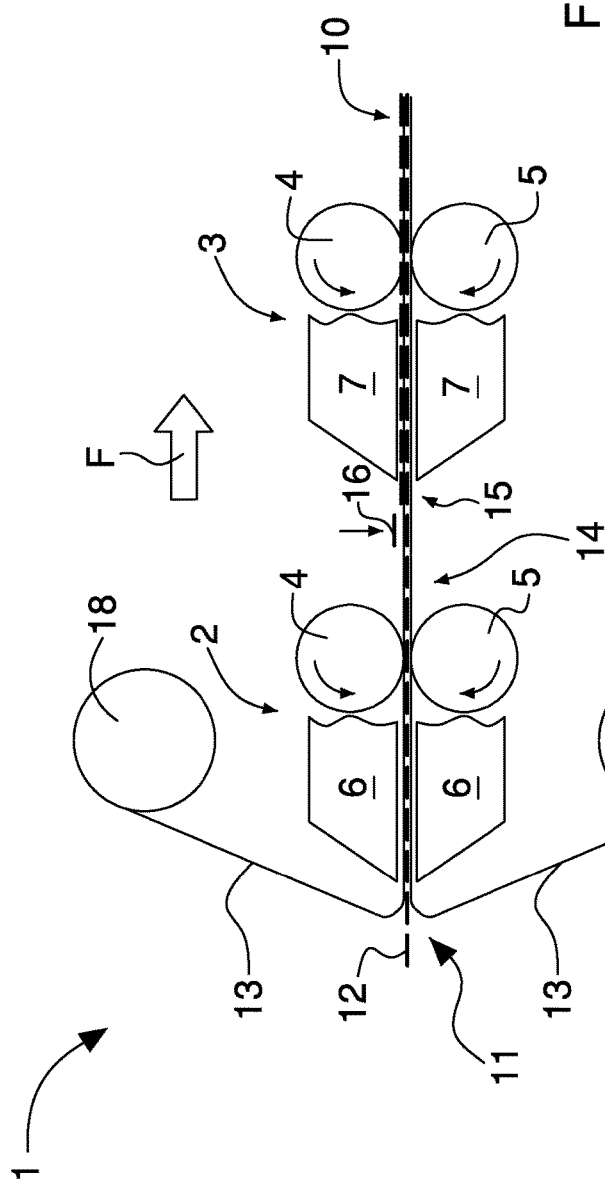
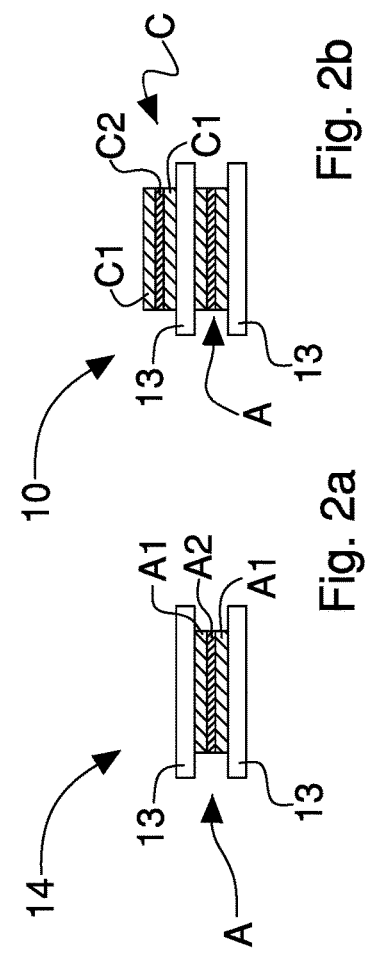
Fig. 1
Fig. 2a
Fig. 2b

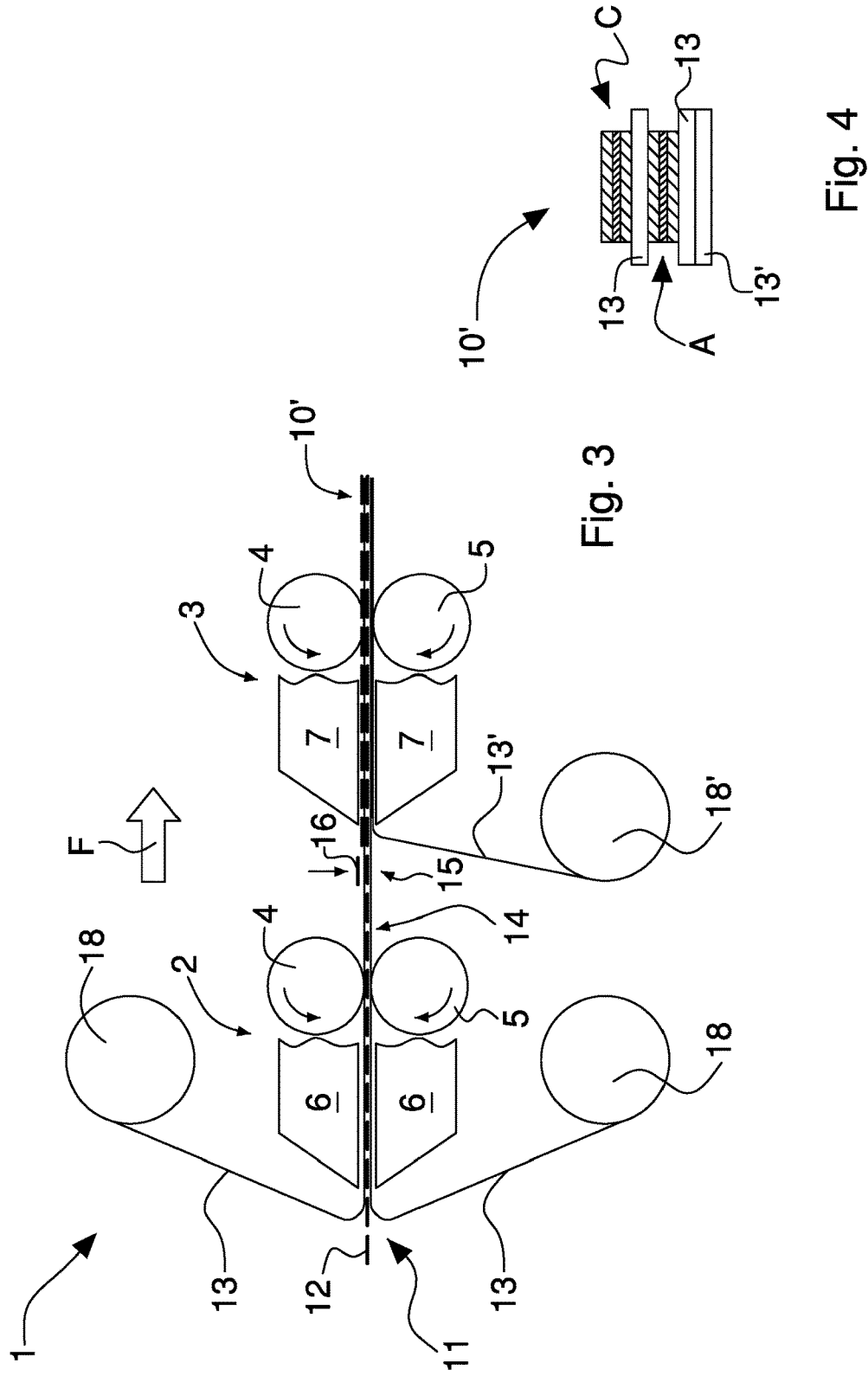

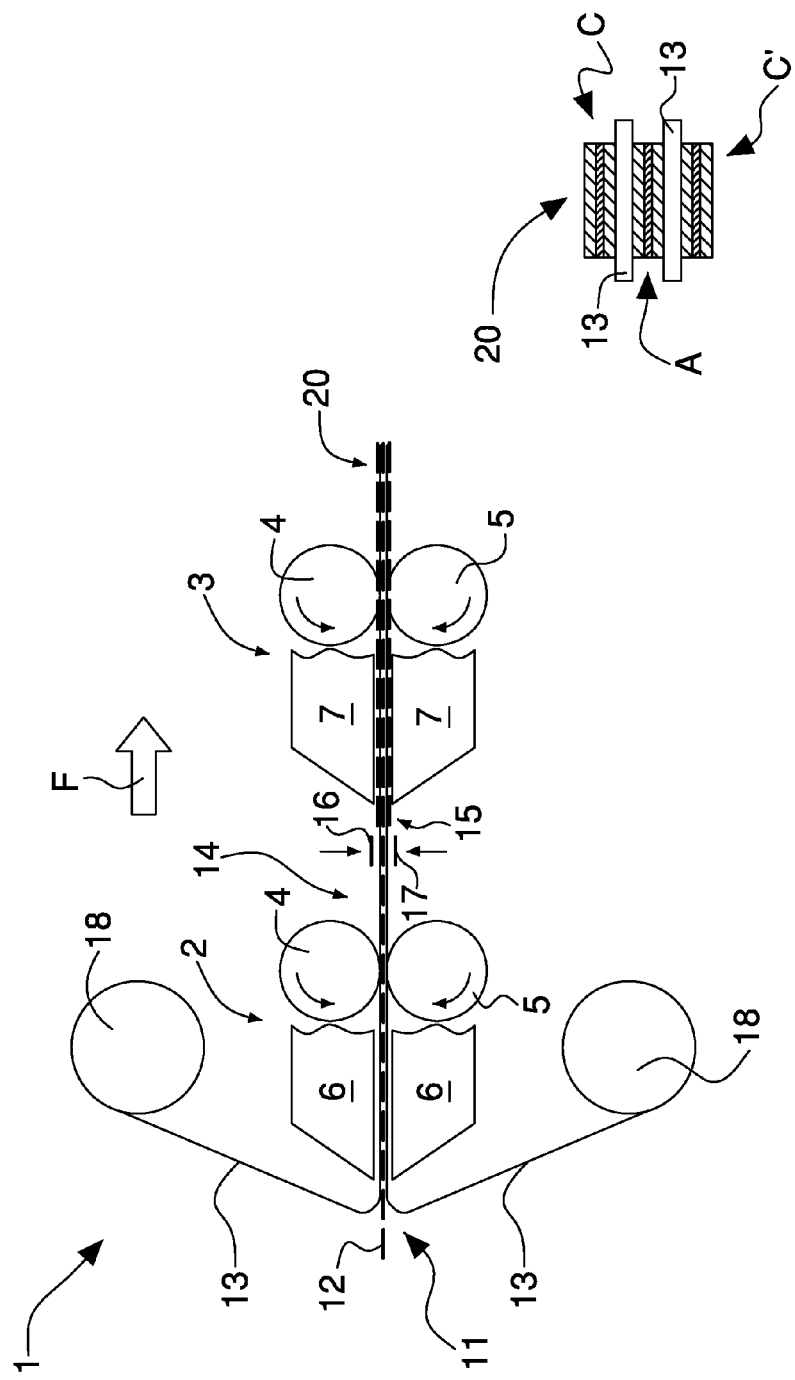

LAMINATING METHOD

RELATED APPLICATIONS

This application is a national stage filing under 35 U.S.C. 371 of International Application No. PCT/IB2014/065926, filed Nov. 10, 2014, which claims priority to Italian Application No. MO2013A000311, filed Nov. 11, 2013. The entire teachings of International Application No. PCT/IB2014/065926, filed Nov. 10, 2014, are incorporated herein by reference. International Application PCT/IB2014/065926 was published under PCT Article 21(2) in English.

BACKGROUND OF THE INVENTION

The invention relates to a method for forming a monocell or a bi-cell for a lithium-ion electric energy accumulating device.

In particular, the method provides the lamination of the monocell or bi-cell components to make them adhere to one another.

It is known to form a monocell or a bi-cell by laminating the cell forming elements through a pair of rollers. These elements typically comprise at least an anode, a cathode and two separating elements. In the case of the bi-cell, in addition to the listed elements this includes a second cathode as well. The anode, or the cathode, is interposed between the two separating elements. One of the two separating elements is interposed between the anode and the cathode in order for the cell to work properly when in use.

As is well-known to the person skilled in the art, a separating element has a microporous structure in which the micropores are intended to accommodate an electrolyte.

A problem that may arise in the formation of cells relates to the closing of the micropores of the separating element during lamination due to the high compression force exerted on the separating elements by the rollers. This deteriorates the features of the cell and, as a result, worsens the quality of the electric energy accumulating device. On the other hand, should the laminating rollers exert a very small compression force (so as not to close the micropores), there is a risk that such force be not sufficient to guarantee adhesion between separating elements, anode and cathode.

Another problem that may arise in the formation of monocells or bi-cells relates to the geometrical stability of the latter. Indeed, a monocell may deform (in particular, it may bend) due to the high temperatures to which it is subjected during lamination. This is due to the fact that both the anode and the cathode have different thermal expansion coefficients from each other. In other words, when the anode and the cathode are heated to high temperatures (such as during a lamination process), the amounts of expansion are different from each other, whereby this causes cell deformation. A deformed cell, this being substantially curved in cross-section, has several drawbacks. In particular, a deformed cell involves problems relating both to the moving thereof (for example, the cells cannot be stacked on top of each other)) and to the subsequent formation of the electric energy accumulating device, whereby this may have a different shape from the expected one, and thus its shape may not be complementary to the one of the housing arranged to accommodate it.

Still another problem relates to the high temperatures and compression forces occurring during the lamination step, whereby these may damage the electrodes (anode and cathode), in particular the cathode.

SUMMARY OF THE INVENTION

An object of the invention is to provide a method for forming a monocell or a bi-cell for an electric energy accumulating device, in particular a lithium-ion electric energy accumulating device, that allows to solve the aforesaid prior art problems associated with the lamination step.

Another object is to provide a method for forming monocells or bi-cells for good-quality electric energy accumulating devices.

An advantage is to provide a method that does not damage the elements to be laminated (the two electrodes and the separating elements) during lamination.

Another advantage is to provide a method wherein the compression force acting on the separating elements does not close the micropores of the separating elements due to crushing, and at the same time guarantees adhesion between the latter and the electrodes.

An additional advantage is to provide a method wherein both the temperatures and the laminating forces preserve the geometrical stability of the cell, i.e.,—in other words—they do not cause any deformation thereof, e.g., due to the bending of the monocell.

Still another advantage is to provide a method wherein the arrangements to be laminated are evenly heated through their whole thickness.

Still an additional advantage is to provide a method that allows to use a lower amount of energy, as compared to the prior art methods, to heat the arrangements to be laminated through their thickness.

Another advantage is to provide a method for forming monocells or bi-cells for continuously-operating electric energy accumulating devices.

In an aspect of the invention, there is provided a method for forming a monocell or a bi-cell for a lithium-ion electric energy accumulating device, this method providing the forming of a first arrangement comprising a first electrode and two separating elements, whereby the electrode is interposed between the two separating elements without yet being laminated to either of the two separating elements; the supplying of the first arrangement to a first laminating unit, for example of the roller type, the laminating of the first arrangement in the first laminating unit so as to obtain a multilayered laminated element, the forming of a second arrangement comprising a second electrode and the multilayered laminated element, the supplying of the second arrangement to a second laminating unit, for example of the roller type, and the laminating of the second arrangement in the second laminating unit so as to obtain the cell.

In this way, both in the first laminating unit and in the second laminating unit it is possible to laminate the first arrangement and the second arrangement, respectively (each having a thickness lower than the total cell thickness) at laminating temperatures and forces lower than the ones that typically characterise the prior art lamination processes for forming monocells or bi-cells. It is thus possible to achieve the results described above.

Thanks to the fact that each laminating unit laminates an arrangement having a thickness lower than the total cell thickness, the thickness of the arrangement can be evenly heated during lamination, and one may use a lower amount of energy for the heating.

In an example, wherein the first electrode is an anode and the second electrode is a cathode, the method according to the invention further allows to significantly reduce the risks of damages to the cathode, this typically being more fragile than the anode and thus more inclined to be ruined during lamination due to the laminating temperatures and forces. Thanks to the inventive method, the cathode undergoes only a single lamination cycle in the second laminating unit, wherein there are reached temperatures and compression forces lower than in the first laminating unit, where, by contrast, the anode is laminated together with the two separating elements. When the latter reach the second laminating unit, they have already been laminated so as to form a multilayered laminated element in the first laminating unit. As a result, in the second laminating unit one may apply lower temperatures and laminating forces, these being sufficient to laminate the cathode to the multilayered laminated element, and at the same time reducing the risk of damage to the cathode.

BRIEF DESCRIPTION OF THE DRAWINGS

The invention may be better understood and implemented with reference to the attached drawings, these showing non-limiting exemplary embodiments thereof.

FIG. 1 shows a schematic view of an apparatus for forming a first example of a monocell for a lithium-ion electric energy accumulating device, wherein one may see the first and the second laminating unit.

FIG. 2a shows a schematic section of a multilayered laminated element that may be obtained from the first laminating unit.

FIG. 2b shows a schematic section of a monocell that may be obtained by means of the apparatus of FIG. 1.

FIG. 3 shows a schematic view of a version of the apparatus of FIG. 1 adapted to form a second example of a monocell.

FIG. 4 shows a schematic section of the second example of a monocell that may be obtained with the apparatus of FIG. 5.

FIG. 5 shows a schematic view of a version of the apparatus of FIG. 1 used to form a bi-cell for a lithium-ion electric energy accumulating device.

FIG. 6 shows a schematic section of a bi-cell that may be obtained with the apparatus of FIG. 5.

DETAILED DESCRIPTION

Referring to FIG. 1, by the numeral 1 there is indicated as a whole an apparatus for forming a first example of a monocell 10 for a lithium-ion electric energy accumulating device (batteries, capacitors, etc.), not shown.

The apparatus 1 comprises a first laminating unit 2 and a second laminating unit 3 arranged in succession along an advancement direction F of the elements to be laminated. The second laminating unit 3, then, is arranged downstream of the first laminating unit 2, with reference to the advancement direction F.

The first and the second laminating unit 2, 3 may be of a known type. The first and the second laminating unit 2, 3 comprise an upper laminating roller 4 and a lower laminating roller 5 that are coupled together and opposite each other to define a laminating zone extending between the rollers. In particular, the latter have rotational axes that are parallel to each other (horizontal). The laminating zone may extend in width in a direction parallel to the axes of the two rollers 4 and 5. Through the laminating zone extending between the rollers 4 and 5 there pass the elements to be laminated (described in detail in the continuation of the description), these being supplied along the advancement direction F transverse to the width of the laminating zone.

The apparatus 1 further comprises a first heating arrangement 6, associated with the first laminating unit 2, and a second heating arrangement 7, associated with the second laminating unit 3. The first and second heating arrangements 6, 7 are arranged close to the first and second laminating units 2, 3, respectively, in particular upstream of the latter with reference to the advancement direction F. The first and second heating arrangements 6 and 7 are arranged to heat the elements to be laminated up to the laminating temperature before they pass through the laminating zone defined between the rollers 4 and 5. The first and second heating arrangements 6 and 7 may be of a known type. In an example, the first and second heating arrangements 6 and 7 may comprise at least an electric resistance.

Referring to the FIGS. 3 and 5, they show schematic views of versions of the apparatus 1 whereby the latter is used to form a second example of a monocell 10' and a bi-cell 20, respectively. For the sake of clearer illustration, in these figures the same reference numerals are used to designate like elements of the several exemplary embodiments.

The method for forming a monocell 10, 10' or a bi-cell 20 for a lithium-ion electric energy accumulating device shall be now described in detail.

The method according to the invention comprises the following steps:

forming a first arrangement 11 comprising a first electrode 12 and two separating elements 13, wherein the electrode 12 is interposed between the two separating elements 13 without yet being laminated to either of the two separating elements 13, supplying the first arrangement 11 to the first laminating unit 2, laminating the first arrangement 11 in the first laminating unit 2 so as to obtain a multilayered laminated element 14 that may be seen in FIG. 2a, forming a second arrangement 15 comprising a second electrode 16 and the multilayered laminated element 14, supplying the second arrangement 12 to the second laminating unit 3, laminating the second arrangement 15 in the second laminating unit 3 so as to obtain the monocell 10 shown in FIG. 2b.

The first electrode 12 and the second electrode 16 are supplied to the first laminating unit 2 and the second laminating unit 3, respectively, in the form of single elements. By contrast, the separating elements 13 are delivered by respective spools 18. In this way, downstream of the laminating units 2, 3 the laminated object is in the form of a continuous multilayered laminated film.

In the examples illustrated and described herein, the first electrode 12 is an anode A and the second electrode 16 is a cathode C.

In other examples, not shown, the first electrode 12 may be a cathode C and the second electrode 16 may be an anode A.

The method according to the invention further provides to heat the first arrangement 11 to a temperature comprised between 50° C. and 200° C. by first heating arrangement 6 prior to the lamination of the first arrangement 11 in the first laminating unit 2.

Still, before laminating the second arrangement 15 in the second laminating unit 3, the method also provides to heat the second arrangement 15 to a temperature comprised between 30° C. and 180° C. by the second heating arrangement 7.

During the lamination of the second arrangement 15 in the second laminating unit 3, the method further provides to apply on the second arrangement 15 a compression force comprised approximately between 600 N and 2800 N.

It is to note, then, that the temperature and the force to which the second arrangement 15 is subjected are lower than those used to laminate the first arrangement 11. As already said, this allows to better preserve the cathode C, this being more fragile and more subject to damages as compared to the anode A. In this way, the cathode C undergoes only a lamination cycle (in the second laminating unit 3) at lower temperatures and forces.

Downstream of the second laminating unit 3 there may be optionally provided one or more working units adapted to deposit respective protective films, not shown and of a known type, on the outermost layers of the multilayered laminated film.

Furthermore, downstream of the second laminating unit 3 there is provided a cutting arrangement that cuts the film previously laminated in sequence in the laminating units 2, 3, so as to obtain a plurality of single monocells 10, 10' or bi-cells 20 of a desired size.

The first example of a monocell 10, shown in FIG. 2b, thus comprises: a first electrode 11 (anode A) and two separating elements 13, forming the multilayered laminated element 14 (laminated in the first laminating unit 2), and a second electrode 16 (cathode C).

The anode A may be a single-coated anode comprising an anode layer A1 and a current manifold layer A2.

The anode layer A1, which may optionally have a thickness comprised between 10 and 100 microns, may optionally include:
- an active anode material, which may include a material selected from a group consisting of: mesocarbon-based MCMB graphite with micropores, $Li_4Ti_5O_{12}$;
- an electrically conductive material, which may include a material selected from a group consisting of: carbon black, lampblack, furnace black, channel black, thermal black, acetylene black, carbonaceous particulate;
- a bonding agent, which may include a material selected from a group consisting of: 1-Methyl-2-pyrrolidone, polyvinylidene fluoride (PVDF).

The current manifold layer A2 comprises a sheet of copper that may optionally have a thickness comprised between 8 and 12 microns.

In the examples shown, the anode A is a double-coated anode comprising a current manifold layer A2 interposed between two anode layers A1.

The cathode C may be a single-coated cathode comprising a cathode layer C1 and a current manifold layer C2.

The cathode layer C1, which may optionally have a thickness comprised between 10 and 100 microns, may optionally include:
- an active cathode material, which may include a material selected from a group consisting of: $LiCoO_2$, $LiNiO_2$, $LiMn_2O_4$, $LiM_xMn_{2-x}O_4$ with $0<x<1$, $LiNi_{1-y}Co_yO_2$ with $0<y<1$, $LiNi_yMn_zCo_{1-y-z}O_2$ with $0<y<1$ and $0<z<1$ and $y+z<1$, $xLi_2MnO_3\cdot(1-x)LiMO_2$ with $0<x<1$ and M=Ni, Co or Cr, $Li(Ni_{1-y-z}Co_yAl_z)O_2$ with $0<y<1$ and $0<z<1$ and $y+z<1$, $LiMPO_4$ with M=Mn or Co, and $LiFePO_4$;
- an electrically conductive material, which may include a material selected from a group consisting of: carbon black, lampblack, furnace black, channel black, thermal black, acetylene black, carbonaceous particulate;
- a bonding agent, which may include a material selected from a group consisting of: 1-Methyl-2-pyrrolidone, polyvinylidene fluoride (PVDF).

The current manifold layer C2 comprises an aluminium sheet which may optionally have a thickness comprised between 15 and 25 microns.

In the examples shown, the cathode C is a double-coated cathode comprising a current manifold layer C2 interposed between two cathode layers C1.

Each separating element 13 may optionally have a thickness comprised between 12 and 30 microns and a porosity comprised between 35% and 80%.

Each separating element 13 may optionally comprise one or more layers of microporous polymer sheets that can be loaded with inorganic particles. The microporous polymer sheets may comprise combinations of polymers selected from a group consisting of: polypropylene (PP), polyethylene (PE), polyvinylidene fluoride (PVDF), polyether ether ketone (PEEK). The inorganic particles may be selected from a group consisting of aluminium oxide ($Al_2O_3$), silicon ($SiO_2$), titanium dioxide ($TiO_2$), calcium carbonate ($CaCO_3$).

Referring to FIGS. 3 and 4, one may see a second example of a monocell 10' which may be obtained thanks to the inventive method. Unlike the monocell 10, the monocell 10' also comprises an additional separating element 13' that is delivered by a related spool 18' and supplied to the second laminating unit 3 (FIG. 3) to be laminated together with both the multilayered laminated element 14 (coming out from the first laminating unit 2) and the second electrode 16 (cathode C). The additional separating element 13' is opposite the second electrode 16. In other words, the multilayered laminated element 14 is interposed between the second electrode 16 and the additional separating element 13'. The monocell 10' thus comprises (FIG. 4): a first electrode 11 (anode A) and two separating elements 13, forming the multilayered laminated element 14 (laminated in the first laminating unit 2), a second electrode 16 (cathode C) and an additional separating element 13'.

Referring to FIGS. 5 and 6, one may see an example of a bi-cell 20 that may be obtained thanks to the inventive method. The bi-cell 20 comprises the monocell 10 and a third electrode 7 (cathode C') that is supplied to the second laminating unit 3 (FIG. 5) to be laminated together with both the multilayered laminated element 14 (coming out from the first laminating unit 2) and the second electrode 16 (cathode C). The third electrode 17 is opposite the second electrode 16. In other words, the multilayered laminated element 14 is interposed between the second electrode 16 and the third electrode 17. The bi-cell 20 thus comprises (FIG. 6): a first electrode 11 (anode A) and two separating elements 13, forming the multilayered laminated element 14 (laminated in the first laminating unit 2), a second electrode 16 (cathode C) and a third electrode 17 (cathode C'). The cathode C' may be a single-coated or double-coated cathode. In the example shown, the cathode C' has substantially the same structure as the cathode C described above.

In an example not shown, the cathode C and the cathode C' may have structures different from each other.

Moreover, there may be variations and additions to what has been described above or to what is illustrated in the accompanying drawings.

The invention claimed is:
1. Method for forming a cell for a lithium ion electric power accumulating device, comprising the steps of:

forming a first arrangement comprising a first electrode and two separating elements, in which the electrode is interposed between the two separating elements;

heating said first arrangement to a first temperature;

after said step of heating said first arrangement, laminating said first arrangement so as to obtain a multilayered laminated element, during said step of laminating said first arrangement a first compression force being applied thereto;

forming a second arrangement comprising a second electrode and said multilayered laminated element;

heating said second arrangement to a second temperature that is lower than said first temperature; and after said step of heating said second arrangement, laminating said second arrangement so as to obtain the cell, during said step of laminating said second arrangement a second compression force being applied thereto, said second compression force being lower than said first compression force.

2. Method according to claim 1, wherein said first temperature is between 50° C. and 200° C.

3. Method according to claim 1, wherein said first compression force is between 700 N and 3000 N.

4. Method according to claim 1, wherein said second temperature is between 30° C. and 180° C.

5. Method according to claim 1, wherein said second compression force is between 600 N and 2800 N.

6. Method according to claim 1, wherein said first arrangement is heated to said first temperature by a first heating arrangement, and said second arrangement is heated to said second temperature by a second heating arrangement.

7. Method according to claim 1, wherein in said step of forming a first arrangement, said electrode is interposed between said two separating elements without yet being laminated to them.

8. Method according to claim 1, wherein said first arrangement is laminated by a first laminating unit, and said second arrangement is laminated by a second laminating unit.

9. Method according to claim 1, wherein said first electrode is an anode and said second electrode is a cathode.

10. Method according to claim 1, wherein said first electrode is a mono-coated anode comprising an anode layer and a current collector layer, said anode layer, includes in turn:
an anode active material, which may includes a material chosen from a group consisting of: graphite MCMB mesocarbon micro-beads, and $Li_4Ti_5O_{12}$;
an electrically conductive material, which may includes a material selected from the group consisting of: carbon black, lampblack, furnace black, channel black, thermal black, acetylene black, and soot;
a binding agent, which includes a material chosen from a group consisting of: 1-Methyl-2-pyrrolidone, and polyvinylidene fluoride (PVDF);
wherein said current collector layer comprises a sheet of copper having a thickness comprised between 8 and 12 micrometers.

11. Method according to claim 1, wherein said second electrode is a mono-coated cathode comprising a cathode layer and a current collector layer, said cathode layer includes in turn:
a cathode active material, which may include a material selected from the group consisting of: $LiCoO_2$, $LiNiO_2$, $LiMn_2O_4$, $LiM_xMn_{2-x}O_4$ with $0<x<1$, $LiNi_{1-y}Co_yO_2$ with $0<y<1$, $LiNi_yMn_zCo_{1-y-z}O_2$ with $0<y<1$ and $0<z<1$ and $y+z<1$, $xLi_2MnO_3 \cdot (1-x)LiMO_2$ with $0<x<1$ and M=Ni, Co or Cr, $Li(Ni_{1-y-z}Co_yAl_z)O_2$ with $0<y<1$ and $0<z<1$ and $y+z<1$, $LiMPO_4$ with M=Mn or Co, and $LiFePO_4$;
an electrically conductive material, which includes a material selected from the group consisting of: carbon black, lampblack, furnace black, channel black, thermal black, acetylene black, and soot;
a binding agent, which includes a material selected from the group consisting of: 1-Methyl-2-pyrrolidone, and polyvinylidene fluoride (PVDF);
wherein said current collector layer comprises an aluminium sheet having a thickness comprised between 15 and 25 micrometers.

12. Method according to claim 11, wherein said first electrode is a mono-coated anode comprising an anode layer and a current collector layer, said anode layer includes in turn:
an anode active material, which may includes a material selected from the group consisting of: graphite MCMB mesocarbon micro-beads, $Li_4Ti_5O_{12}$;
an electrically conductive material, which includes a material selected from the group consisting of: carbon black, lampblack, furnace black, channel black, thermal black, acetylene black, soot;
a binding agent, which includes a selected from the group consisting of: 1-Methyl-2-pyrrolidone, and polyvinylidene fluoride (PVDF);
said current collector layer comprising a sheet of copper having, for example, a thickness comprised between 8 and 12 micrometers, wherein said first electrode comprises a bi-coated anode, that includes said current collector layer interposed between two anode layers, and wherein said second electrode comprises a bi-coated cathode, which includes said current collector layer interposed between two cathode layers.

13. Method according to claim 1, wherein each of said two separating elements comprises one or more layers of polymeric micro-porous sheets that may is loaded with inorganic particles, wherein:
said one or more layers of polymeric micro-porous sheets comprise combinations of polymers selected from the group consisting of: polypropylene (PP), polyethylene (PE), polyvinylidene fluoride (PVDF), and polyether ether ketone (PEEK); and
said inorganic particles is chosen from a group consisting of: aluminium oxide ($Al_2O_3$), silicon dioxide ($SiO_2$), titanium dioxide ($SiO_2$), and calcium carbonate ($CaCO_3$),
and wherein each of said separating elements has a thickness comprised between 12 and 30 micrometers and porosity comprised between 35% and 80%.

14. Method according to claim 1, wherein a third electrode is supplied to be laminated together with said second electrode and said multilayered laminated element, wherein said multilayered laminated element is interposed between said second electrode and said third electrode without yet being laminated to any of said electrodes.

15. Method according to claim 1, wherein a further separating element is supplied to be laminated together with said second electrode and said multilayered laminated element, wherein said multilayered laminated element is interposed between said second electrode and said further separating element.

16. Method according to claim 1, wherein said first electrode is a cathode and said second electrode is an anode.

* * * * *

UNITED STATES PATENT AND TRADEMARK OFFICE
CERTIFICATE OF CORRECTION

PATENT NO. : 10,020,541 B2
APPLICATION NO. : 15/034541
DATED : July 10, 2018
INVENTOR(S) : Massimiliano Sale and Marco Vivarelli Page 1 of 1

It is certified that error appears in the above-identified patent and that said Letters Patent is hereby corrected as shown below:

In the Claims

Column 7, Claim 10, Lines 46-47, delete "which may includes a material chosen from a" and insert --which includes a material selected from the--;

Column 7, Claim 10, Line 49, delete "which may includes" and insert --which includes--;

Column 7, Claim 10, Line 53, delete "a material chosen from" and insert --a material selected from--;

Column 7, Claim 11, Line 65, delete "$LiNi_{1-v}Co_vO_2$" and insert --$LiNi_{1-y}Co_yO_2$--;

Column 7, Claim 11, Line 66, delete "$LiNi_vMn_zCo_{1-v-z}O_2$" and insert --$LiNi_yMn_zCo_{1-y-z}O_2$--;

Column 8, Claim 12, Line 18, delete "which may includes" and insert --which includes--;

Column 8, Claim 12, Line 25, delete "includes a selected" and insert --includes a material selected--;

Column 8, Claim 13, Line 38, delete "that may is loaded" and insert --that is loaded--; and Column 8, Claim 13, Line 45, delete "particles is chosen from a group" and insert --particles is selected from the group--.

Signed and Sealed this
Fourth Day of December, 2018

Andrei Iancu
*Director of the United States Patent and Trademark Office*